United States Patent
Shagam

[19]

[11] Patent Number: 5,987,550
[45] Date of Patent: Nov. 16, 1999

[54] LOCK MECHANISM FOR SHARED RESOURCES IN A DATA PROCESSING SYSTEM

[75] Inventor: Eli Shagam, Brookline, Mass.

[73] Assignee: EMC Corporation, Hopkinton, Mass.

[21] Appl. No.: 09/107,537

[22] Filed: Jun. 30, 1998

Related U.S. Application Data

[63] Continuation-in-part of application No. 08/884,890, Jun. 30, 1997.

[51] Int. Cl.[6] .................................................. G06F 13/36
[52] U.S. Cl. ...................... 710/119; 710/108; 710/109; 710/36; 711/147
[58] Field of Search ...................... 395/299, 288, 395/289, 856; 711/147–153; 710/119, 108, 109, 36

[56] References Cited

U.S. PATENT DOCUMENTS

| | | | |
|---|---|---|---|
| 4,000,485 | 12/1976 | Barlow et al. | 395/726 |
| 4,587,609 | 5/1986 | Boudreau et al. | 395/726 |
| 5,321,825 | 6/1994 | Song | 395/163 |
| 5,404,482 | 4/1995 | Stamm et al. | 711/145 |
| 5,432,929 | 7/1995 | Escola et al. | 707/9 |
| 5,459,840 | 10/1995 | Isfeld et al. | 395/309 |

*Primary Examiner*—Ayaz R. Sheikh
*Assistant Examiner*—Ario Etienne
*Attorney, Agent, or Firm*—John M. Gunthe, Esq.; Leanne J. Fitzgerald, Esq.

[57] ABSTRACT

A shared resource lock mechanism is provided which enables processors in a multi-processor system which each share common resources to obtain locks on those resources using a transactions which minimizes the amount of time system resources are unavailable, while also allowing system resources to be available for other processing tasks.

8 Claims, 5 Drawing Sheets

LOCK MECHANISM FOR SHARED RESOURCES IN A DATA PROCESSING SYSTEM

CROSS REFERENCE TO RELATED APPLICATIONS

This application is a continuation-in-part of Ser. No. 08/884,890, filed Jun. 30, 1997.

FIELD OF THE INVENTION

This invention relates generally to data processing systems and more particularly to a method and apparatus for simplifying the bus locking transaction normally associated used to manipulate system locks.

BACKGROUND OF THE INVENTION

As it is known in the art, data processing systems generally include several types of processing resources which may be interconnected by one or more communication busses. In addition to the processor resources, data processing systems also generally include some sort of memory which is typically shared amongst the processor resources. As is common in many computer systems these processing resources may act independently to perform different processing tasks. Since each of the processing resources may act independently there may arise a situation where there is contention for the shared memory resources within the system.

One example of a data processing system which includes several processing resources coupled to a common memory over one or more busses are data storage systems such as the Symmetrix family of data storage systems manufactured by EMC Corporation. These storage systems are typically capable of being coupled to several different host computers at any given time and provide storage services to each of those computers independently. In order to support transactions between a plurality of host computers simultaneously the storage system includes several host controllers for managing the communication between the host computer and the storage system. In addition, the Symmetrix storage systems mentioned above include several disk controllers which are each responsible for managing one or more arrays of disk type storage devices.

In addition to the host controllers and disk controllers mentioned above the storage subsystem may also contain a very large global memory which is used to manage the transfer of data from the host computers to the storage devices as well as to manage the transfer of data from the storage devices to the host computer.

During the operation of the data storage system described above, it is often necessary for any one or the host controllers or disk controllers to require access to a particular section of the global memory in order to set a system lock in order to guarantee exclusive access to a particular storage system resource. One method known in the art for locking shared resources is to perform a so called read/modify/write operation with a lock.

In order to perform such a command, prior art data processing systems require that the requesting processor gain exclusive access to the bus and to the memory storing the lock records. Once the requesting processor gains control of the bus, the bus is locked to all other users connected to the bus. During the period when the bus is locked, the requesting controller will generally read the data from the lock data structure into it's own internal memory. The processor will then operate to modify the data (i.e. write the data necessary to lock the resource) and then write the data back to lock data structure in the memory.

The reason that the bus is generally locked throughout this entire transaction is to prevent another processor from attempting to perform a similar operation. That is, for example, if the original processor was setting the lock record data structure and the bus was not in the locked state, a second processor might read the lock data structure and think that no other processor held the lock on that resource and also attempt to lock the same resource. By locking the entire bus, other processors are prevented from accessing that particular lock record. The disadvantage of such a scheme is fairly obvious in that not only can other processors not access the shared lock records, the other processors cannot carry on any other transactions over the locked system bus while the first processor is doing those operations necessary to gain a lock on the system resource.

In a system with a dual bus architecture, it might first appear that the system would be able to continue to perform useful work over the second bus while the first bus was locked by the first processor performing the lock transaction. However, as described above, the memory with the desired lock record is locked as well. If one of the processors connected to the second bus attempted to gain access to the same memory which was the subject of the first lock transaction (in order to perform any memory transaction), the second processor would perform those steps above to gain a lock on a system resource. That is, the second processor would first gain access to the second bus. It would then attempt to access the memory which has already been locked by the first processor. The second processor will wait for the memory to become unlocked so that it can perform its transaction. At this point, both buses and the memory are locked by the two processors trying to accomplish lock transaction to the same memory. It can be seen then that this scenario leads to a situation when the entire system is prevented from doing any useful work because two processors are seeking to get locks on system resources. This problem is extensible to systems of multiple buses and those that may use cross bar switches to provide connectivity between various elements of a data processing system.

Previous methods attempting to solve the above described bus and/or system lock problem have generally included maintaining a table within the global memory. The table is used to indicate which addresses within the memory are locked at any given. In order to perform lock functions, the table would need to be accessed and read. This solution, however, may still lead to the situation where at least one bus in a multi-bus system is locked while the lock records are updated using an exclusive read modify write (with lock) type command.

It would be advantageous therefore to provide a data processing system in which resources such as a memory are shared amongst a plurality of processing devices where hardware locks could be set and reset without requiring that any of the busses be locked and thereby preventing the system from doing useful work.

SUMMARY OF THE INVENTION

In accordance with the present invention, a lock mechanism for managing shared resources in a data processing system is provided. The lock mechanism of the present invention eliminates prior art needs of locking buses and memories during the lock setting process. The invention includes in shared memory, a lock circuit which is local to the memory having the lock records associated with the shared resources. The lock circuit includes a reservation table which is used to reserve certain predetermined information from certain commands from a controller, or from a CPU within the controller. In one embodiment the lock mechanism operations as follows. When a controller of the data processing system desires to set a lock, it first issues a read lock operation to the memory in order to read the lock record associated with the resource to be locked. In response the memory does two things. It reads the data from the lock record and transmits it to the controller. The lock circuit of the memory also places an entry in the reservation table indicating the address of the lock record and the identity of the controller which sent the request. Upon receipt of the data from the lock record, the controller examines the data to determine if another controller has locked the desired resource. If no other controller has locked the resource, the controller sends a conditional write operation to the memory. The conditional write operation includes both the address of the lock record associated with the resource and an identifier of itself. When the memory receives the conditional write operation it checks the reservation table to ascertain if the reserved address matches the address contained in the conditional write operation, and if the conditional write operation came from the same controller (or CPU) and is associated with the entry for the address in the reservation table. If the two pieces of information match, the indication is that the lock setting transaction is still in process, and at this point the memory overwrite the lock record associated with the address, thus locking the desired resource. Once the lock record has been updated, the reservation table is cleared. The present invention allows for the setting of locks associated with shared resources without the need to lock system busses and memories, and does so with a minimal amount of processing cycles.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
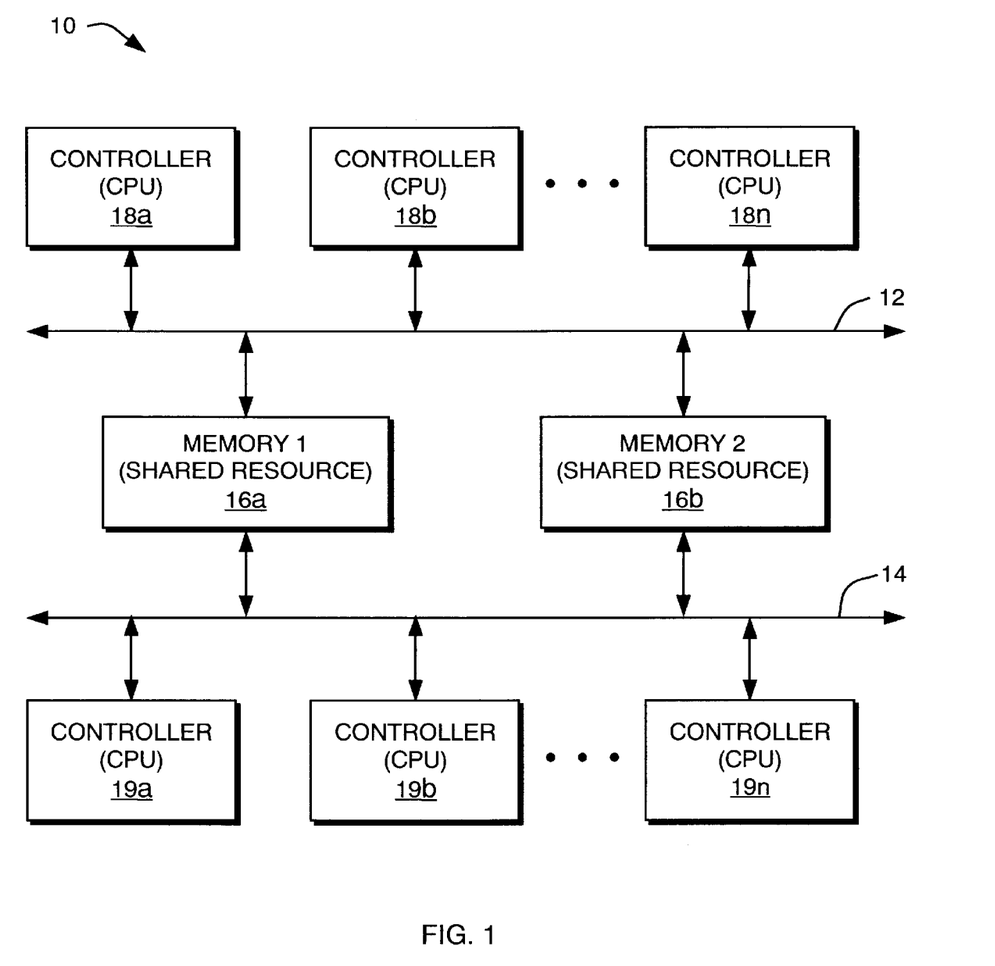
FIG. 1 is a block diagram of a preferred embodiment of the data processing system incorporating the present invention.

Referring now to FIG. 1, a preferred embodiment of data processing system incorporating the present invention is shown. In particular, data processing system 10 is shown to include a plurality of controllers or processors 18a through 18n. Each of these controllers is coupled to a first data processing bus 12. Also included in data processing system 10 are a second plurality of controllers or processors 19a through 19n coupled to a second data processing bus 14. Each of the controllers 18a through 18n and 19a through 19n are also coupled to a first and second memory 16a and 16b via the respective busses 12 and 14. The controllers 18a through 18n and 19a through 19n could be any type of electronic device which transmits, receives or operates on computer data. Furthermore, the controllers 18a–18n and 19a–19n may be alternately coupled to buses 12 and 14. For example controller 18a may be coupled to bus 12 while controller 18b is coupled to bus 14. Similarly controller 19a may be coupled to bus 14 while controller 19b is coupled to bus 12.

In a preferred embodiment of the present invention, controllers 18a through 18n are so-called host controllers and are resident within a storage subsystem. As such controllers 18a through 18n are used to manage the communications between a variety of host computers (not shown) and the storage system of which they are a part. Also according to the preferred embodiment, controllers 19a through 19n are so-called disk controllers which are used to manage the transfer of data between arrays of disk storage devices (not shown) and the host computers via the host controllers 18a through 18n and memories 16a and 16b. Although the present invention will be described in the context of a data storage system, the principles of the invention are equally applicable to any multi-processor data processing system incorporating a shared memory. For example, the lock mechanism of the present invention is applicable to a multiprocessor host computer system where the processors communicate over shared busses and share a global and or cache memory. Thus, the storage system aspects described for the preferred embodiment should not be seen as limitations of the present invention.

During the operation of data processing system 10, it is often necessary for each of the controllers 18 and 19 to access each of the memories 16a and 16b in order perform their respective data processing functions. Since each of the memories is coupled to each of the busses 12 and 14 which are in turn coupled to each of the controllers, the memory resources are generally shared by each of the controllers within the data processing system. Each of the memories 16a and 16b may be used to maintain a so-called lock record or a plurality of lock records which correspond to various resources within the data processing system 10. One example of a resource which may have an associated lock record stored in one of the memories would be a particular one of the physical storage devices coupled to one of the controllers 19a through 19n.

At some time during the operation of data processing system 10 it may be necessary for one of the controllers, for example controller 19a, to gain exclusive control over one of it's associated storage devices. In order to do so, controller 19a would need to establish a lock in whichever memory the lock record was maintained. As described in the background of the invention section, previous methods of manipulating a resource lock have included performing a three memory cycle transaction or two indivisible transactions in order to set a resource lock. There are at least two general types of lock cycles. One is a read/modify/write lock cycle and the other is a read/compare/write lock cycle. The read modify write lock cycle may be used to increment a shared counter within data processing system 10. The read/ compare/write lock cycle may be used in data processing system 10 to manipulate software locks.

For a read/compare/write lock cycle, the first memory cycle would include having controller 19a read the associated lock record from, for example memory 16a, into a local storage of controller 19a. Once the lock record is read into the local storage of controller 19a, the CPU of controller 19a would examine the lock record data in order to determine whether or not the record data read from memory 16a indicated that the resource that controller 19a desired to lock had already been locked by another controller. Generally this may be indicated with something as simple as having a single bit set in a particular location of the lock record which indicates whether or not the resource is locked or not locked. In prior art systems, once the controller determined that the resource was not locked, the controller would then execute a so-called read lock operation to the same lock record in memory 16a.

A read lock operation includes having controller 19a gain control of bus 14 and place bus 14 in a locked state. As described previously, having bus 14 in a locked state means that no other controller attached to bus 14 may use the bus to perform any transactions. Furthermore, the read lock operation causes the memory 16a (i.e., the memory having the desired lock record) to also be placed in locked state. This would result in memory 16a being unavailable for access by any controller in data processing system 10. While controller 19a has exclusive access to the bus 14 and memory 16a, it will do a second read of the lock record within memory 16a and again analyze the record to ensure that between the time when it first read the lock record and the time it gained exclusive access of the bus that the record had not been locked another controller. Once the controller determines that the record is not already locked it will update lock record in memory 16. Updating the lock record includes writing any data required to identify the resource associated with the lock record and also set the appropriate bit indicating that the record has been locked. Once the write transaction has been completed, the memory 16a and bus 14 will be released by controller 16a and return to a state where they may be used by other controllers of data processing system 10.

The disadvantages of the above described locking scheme are apparent and have been described in the background of the invention section. Thus, according to the present invention an improved lock mechanism is provided which does not require the locking of either memory 16a or 16b, or either bus 12 or 14 by a controller which is seeking to gain a lock over particular resource of data processing system 10. In it's most general form one aspect of the lock mechanism of the present invention allows the setting of software locks and operates as follows. When one of the controllers of data processing system 10 (for example controller 18b) needs to gain exclusive control over a resource of data processing system 10 (i.e. set a software lock), the controller 18b will first read the associated lock data from the appropriate lock record from the memory 16a or 16b and store it in a local storage of the controller 18b. The controller will then examine the contents of the data read from the lock record data to determine whether the resource is already locked (i.e., whether a lock indicator has been established in the lock record). If the data read from the memory indicates that the record has been locked by another controller of the data processing system, then the lock transaction ends at that point in time. If, however, the controller determines that the resource has not been locked by another controller, the controller will prepare new lock data to be written to the lock record of the associated memory and transmit this new lock record data along with old lock record data to the memory.

Once the memory 16a has received both the new and the old lock record data associated with the lock record, the memory will operate to compare the old lock record data received from controller 18b with the current contents of the target lock record to determine if the lock record (i.e. the resource associated with the look record) is still in an unlocked state. If the record is in an unlocked state, the memory will then overwrite the contents of the lock record with the new lock record data received from controller 18b, thus locking the associated resource by controller 18b. It should be noted that the initial read of the lock record by controller 18b is done as a normal read operation which did not require locking bus 12 or the memory which contained the locked record. Furthermore, the writing of the old data and new data to the memory 16a is accomplished with a normal write operation which does not require the locking of bus 12 or the memory containing the locked record. As such it can be seen that using the present invention, a system of locks in data processing system 10 may be manipulated and maintained without requiring either the memories or the busses 12 and 14 to be locked for any part of the lock manipulation transactions.

Another example of a lock cycle is the read/modify/write operation used to increment a shared counter as mentioned above. In accordance with the invention, the procedure for incrementing a shared counter operates in a similar fashion as described above with the read/compare/write operation used for software locks. The necessity of prior art systems to lock the bus and the counter resource in order to update the counter is well known. The present invention eliminates the bus/resource lock associated with the prior art methods. According to the invention, in order to update a shared counter, the updating controller will read the counter value from the memory as described above. However, instead of examining the counter to determine a lock state, the controller will simply increment the counter and transmit both the incremented value and the old value to the memory in a single bus transaction. Upon receipt the memory will compare the old value as received from the controller with the current value in the memory. If the two values match, then the counter was not incremented during the interim when the controller was updating the counter value. At this point, the memory will overwrite the old counter value with the incremented value.

If the old counter value transmitted to the memory by the controller had not matched the current value in the memory, this would have indicated that another controller had incremented the counter. Thus the attempt by the first controller to increment the counter would fail. Such a failure would be transmitted by the memory to the first controller.

In accordance with another aspect of the present invention, the procedure for implementing a shared counter operates in similar fashion as described with the read/write operation used for software locks. The present invention both eliminates the bus/resource lock associated with prior art methods as well as implementing a shared counter with a minimum of cycles. According to the invention, in order to update a shared counter, the updating controller will read the counter value from memory as described above in association with the read lock operation. Like the earlier described read lock operation, the memory will reserve the identifier of the controller which sent the read lock request. However, instead of examining the counter to determine a lock state and sending the conditional write operation, the controller will simply increment the counter, and transmit the incremented value back to the memory in a conditional write operation. Upon receipt the memory will look at the identifier of the controller which sent the conditional write, and if it matches the earlier identifier sent by the controller, the memory will overwrite the old counter value with the incremented value.

If the identifier transmitted to the memory by the first controller had not match the reserved identifier, this would indicate that another controller had incremented the counter, and a failure notification would have been sent back to the first controller. The controller upon receipt of a failure notification could try again to increment the counter.

According to the present invention an improved lock mechanism is provided which only requires the locking of a single memory 16a or 16b and either bus 12 or 14, by a controller which is seeking to gain a lock over a particular resource of data processing system 10. The lock mechanism of the present invention only locks the particular memory or bus for a very short period of time, as well as reducing the number of cycles that a memory or controller is required to utilize in activating a locking mechanism.

The lock mechanism of one embodiment of the present invention allows for the setting of software locks and operates as follows. As in the prior art, one of the controllers (19a, for example) needs to gain exclusive control over a resource (i.e. a physical storage device coupled to controller 19a) of data processing system 10 (i.e. set a software lock), the controller 19a will read the associated lock record into local storage of the controller 19a. Once the lock record is read into the local storage of controller 19a, the CPU of controller 19a would examine the lock record in order to determine whether a resource is already locked. That is, has a lock indicator been established in the lock record for the resource. If the data read from the memory indicates that the locked record has been locked by another controller of the data processing system 10, then the lock transaction ends at that point in time. If, however, the controller 19a determines that the resource has not been locked by another controller, the controller 19a begins the actual lock transaction.

Generally, the lock mechanism of the preferred embodiment of the present invention allows for the setting of software locks and operates as follows. When one of the controllers of data processing system 10 (for example controller 18b) needs to gain exclusive control over a resource of data processing system 10 (i.e. set a software lock), the controller 18b will begin the lock sequence by executing a read lock command or operation to a single specific location or address in memory (for example 16a). The read lock operation to a specific address in the memory 16a causes the memory 16a to reserve this specific address in a reservation table (as will be shown in conjunction with FIG. 5). Along with reserving the specific address in the reservation table, an identifier for the controller or processor 18b which sent the read lock operation is also reserved in the reservation table by the memory 16a. The read lock operation only causes the bus 12 and the memory 16a to be not available during the duration of the read lock operation, as is the case for any input/output (I/O) operation. This period of unavailability is very short, since, unlike the prior art read lock operation, a second read is not attempted. Once the read lock operation is completed the bus 12 and memory 16a are available for use by other members of the data processing system 10.

Subsequently, controller 18b, in the preferred embodiment of the invention, sends a conditional write operation to the same specific address in memory 16a, as it sent the read lock operation to earlier. If this address (i.e. address 1) is still reserved in the reservation table by the controller 18b, which sent the earlier read lock command, then the conditional write operation succeeds. Thus, the memory 16a looks the information reserved in the reservation table to check if there is an identical match of the information from the two operations. If a match is found between the two controller identifiers and the addresses, the conditional write succeeds and memory 16a updates the appropriate lock record, locking the desired resource. Once the conditional write operation is completed, the reservation table is cleared of the reserved information.

If the address in memory 16a is not reserved for the controller which sent the conditional write operation, then the conditional write operation fails, as the conditional write operation should be proceeded by the read lock operation, which reserves the particular address for a particular controller. If a conditional write operation fails, the controller which sent the conditional write operation will receive a lock fail notification from the memory 16, informing the controller that the lock attempted with the conditional write operation was not successful. The desired resource will not be locked. If a lock fail notification is received by the controller, the controller may make additional attempts to lock the desired resource for itself. Thus, if the desired resource ceases to be locked the controller can continue to attempt to lock it.

Once the initial read lock operation is done and an address has been reserved for a particular controller in the reservation table, subsequent operations will cause different reactions from the memory. Any subsequent read lock operation by the same controller 18b to a different address (i.e. address 2) in memory 16a will cause another reservation to be set for that specific address. The memory 16a will reserve the specific address (address 2) for the controller 18b which sent the read lock request.

A read lock operation sent from a different controller (i.e. 18a) to the same address (address 1) in memory 16a, which was previously reserved by a different controller, will not cause the already existing reservation to be removed. Thus, the read lock operation will fail, as the address has already been reserved, and a subsequent conditional write from the controller 18a will not cause the desired resource to be locked.

In one embodiment of the invention, a subsequent write operation (after a read lock operation from controller 18b which has reserved address 1 in memory 16a), by a different controller, 18a, to the address 1 in memory 16a will succeed. However, the reservation on address 1 will be removed.

Alternatively, in another embodiment of the present invention, a subsequent write operation (after a read lock operation from controller 18b which has reserved address 1 in memory 16a) to the address 1 in memory 16a from a different controller 18a will not succeed, and a fail lock notification will be send to the controller 18a.

Any read operations (after a read lock operation from controller 18b which has reserved address 1 in memory 16a) from a different controller 18a to the address 1 in memory 16a, will succeed, and the desired data will be read. However the existing reservation will not be removed, and the memory 16a will still be ready to receive a conditional write operation from the controller 18b in order to lock a desired resource.

Lastly, any read or write operations (after a read lock operation from controller 18b which has reserved address 1 in memory 16a) from controller 18b, will succeed. However, the reservation for address 1 in the reservation table memory 16a will be removed.

The reservation table (which is shown below) also could contain a means for ensuring that the reservations contained in the reservation table do not remain there permanently. In the preferred embodiment of the invention the reservation table includes a time out means. Once a read lock operation is received by the memory 16a from any controller, and an address is reserved in memory 16a, if a conditional write operation is not received within a very short predetermined period of time (20–50 microseconds, although any time period could be used), then the reservation is removed, freeing the address up for use by either the same controller or a different one. The setting of the predetermined time period before removing a reservation may be a function of the particular bus arbitration method used for the busses in the system 10.

It should be noted that the locking transaction of the present invention is a simple one accomplished with only two operations from the controller 18b, saving valuable cycle times of the controller 18b and the memory 16a, without causing anything beyond normal interruption of the availability of the busses and memory. The lack of operations used to effectuate the present lock mechanism also means that it is simple to implement. As such, it can be seen, a system of locks in a data processing system 10 may be manipulated and maintained with only a minimal amount of locking of busses and memories, and a minimal amount of cycle time of valuable system resources.

Figure 2:
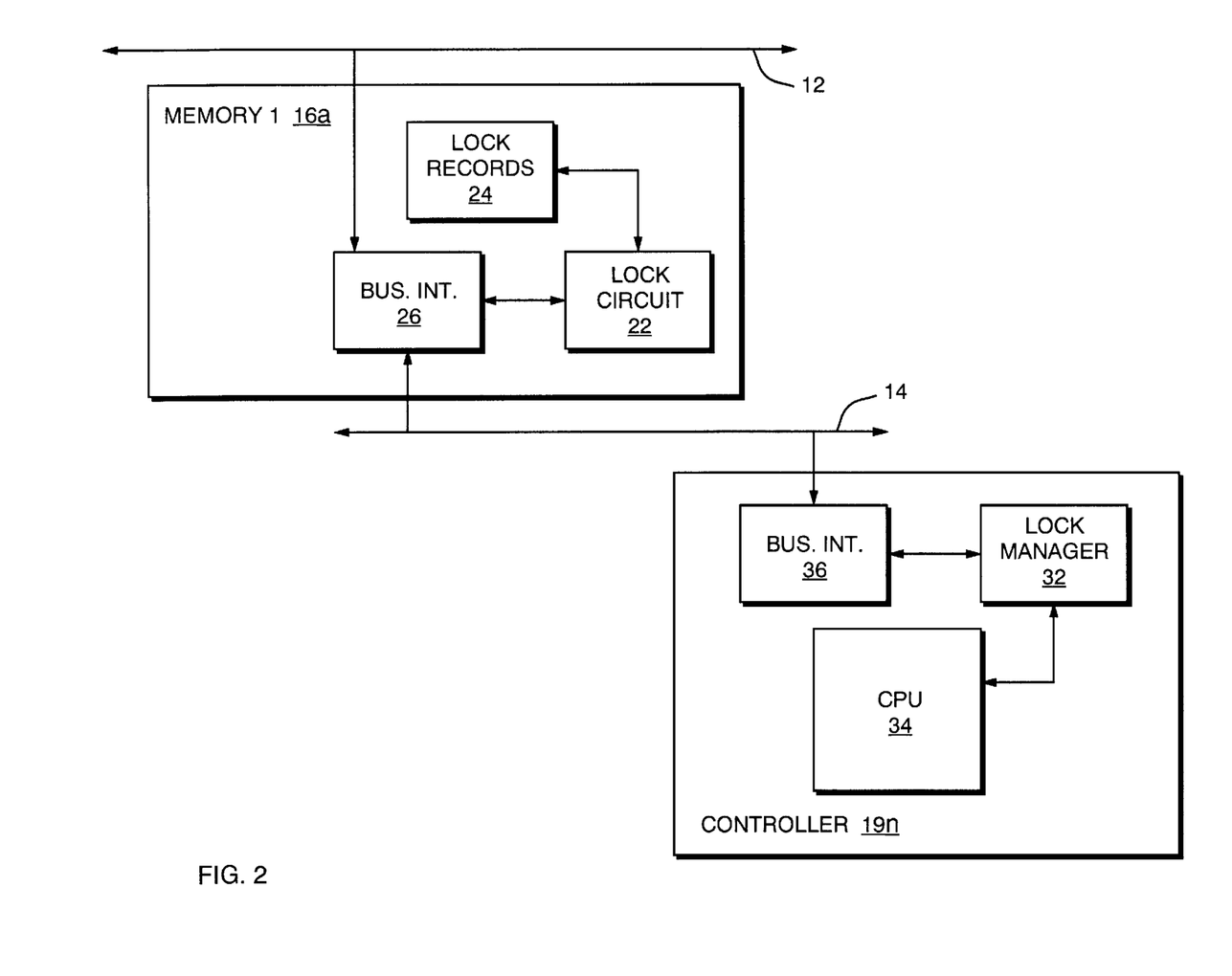
FIG. 2 is a block diagram of exemplary ones of the memory and controllers of the data processing system of FIG. 1 and shows in detail an embodiment of the lock mechanism of the present invention.

Referring now to FIG. 2, the lock mechanism of one embodiment of the present invention will now be described in more detail. FIG. 2 depicts an exemplary one of the controllers from FIG. 1 as well as an exemplary one of the memories also from FIG. 1. As shown in FIG. 2, each one of the controllers includes among other things a bus interface 36 coupled to a lock manager 32. Additionally, lock manager 32 is also coupled to CPU 34. Bus interface 36 provides the interface between controller 19n and bus 14 as shown. Memory 16a includes among other things a lock circuit 22 which is coupled to both the bus interface and the lock record data structure 24. Bus interface 26 of memory 16a provides similar functions as bus interface 36 of controller 19n. That is, the bus interface provides an interface between memory 16a and bus 14. In addition, bus interface 26 of memory 16a also provides an interface to bus 12.

As described previously, in one embodiment of the invention, in order to access and set a lock of one of the locks in lock record data structure 24, controller 19a will first send a request from CPU 34 via bus interface 36 over bus 14 to bus interface 26 indicating that it wishes to read a particular lock record from lock records 24. Memory 16a will respond by having lock circuit 22 access the lock records 24 reading the data from particular lock record and transmitting the data from the particular lock record to controller 19a via bus interface 26. Controller 19a will receive the data from the lock record at bus interface 36 and pass a copy of the data to lock manager 32. Lock manager 32 will examine the data read from the particular lock record to determine whether the resource associated with the lock from lock records 24 has already been locked by another controller of the data processing system. In addition, lock manager 32 in cooperation with CPU 34 will prepare a set of data to be written to the lock record associated with the lock record data originally read from lock record data structure 24. If lock manager 32 has determined that the lock read from lock record data structure 24 is not locked by another controller of the data processing system, the lock manager will pass the original data read from the lock record along with the new data prepared by CPU and lock manager 32 via bus interface 36 and bus 14 to memory 16a.

The data will be received by the bus interface 26 and passed to lock circuit 22. Lock circuit 22 will then read the associated lock record again from lock record data structure 24, and compare the data read from the lock record with the old lock record data transmitted by controller 19n, in one embodiment of the invention. If the two data match, the indication is that during the time when controller 19a has been analyzing and preparing new lock record data that no other controller has set a lock on that particular resource via the associated lock record. At that time, lock circuit 22 will then copy the contents of the new lock record data into the lock record of lock record data structure 24. Once written, controller 19n will have exclusive control over the resource associated with particular lock record until controller 19n releases the lock.

It should be understood that the initial read of the lock record from lock record 24 is done using a standard read command by controller 19n. If, after reading the lock record, the lock manager 32 had determined that another controller had locked the resource of interest, then the lock cycle ends and no additional bus activity occurs unless controller 19n wishes to check the particular lock at a later time. Furthermore, the process of obtaining the lock of the particular resource by writing the associated lock record data to lock record data structure 24 is also achieved without locking bus 14. The locking of the particular resource is achieved by performing a standard write command which transmits two words of data in a single transaction over bus 14 to bus interface 26 of memory 16a. The remaining processing required to obtain a lock on a particular resource is then handled by lock circuit 22 in cooperation with lock records 24 as described above.

If, after transmitting, the two words of data (i.e., old lock record data and new lock record data) lock circuit 22 determines that another controller obtained a lock in the interim, memory 16a will transmit a status to controller 19n indicating that the lock had failed. On the other hand, if no other controller of the data processing system had obtained a lock on the particular resource, memory 16a will transmit a status indicating a successful completion of the lock command (i.e. granting of the lock) to controller 19n.

Figure 2A:
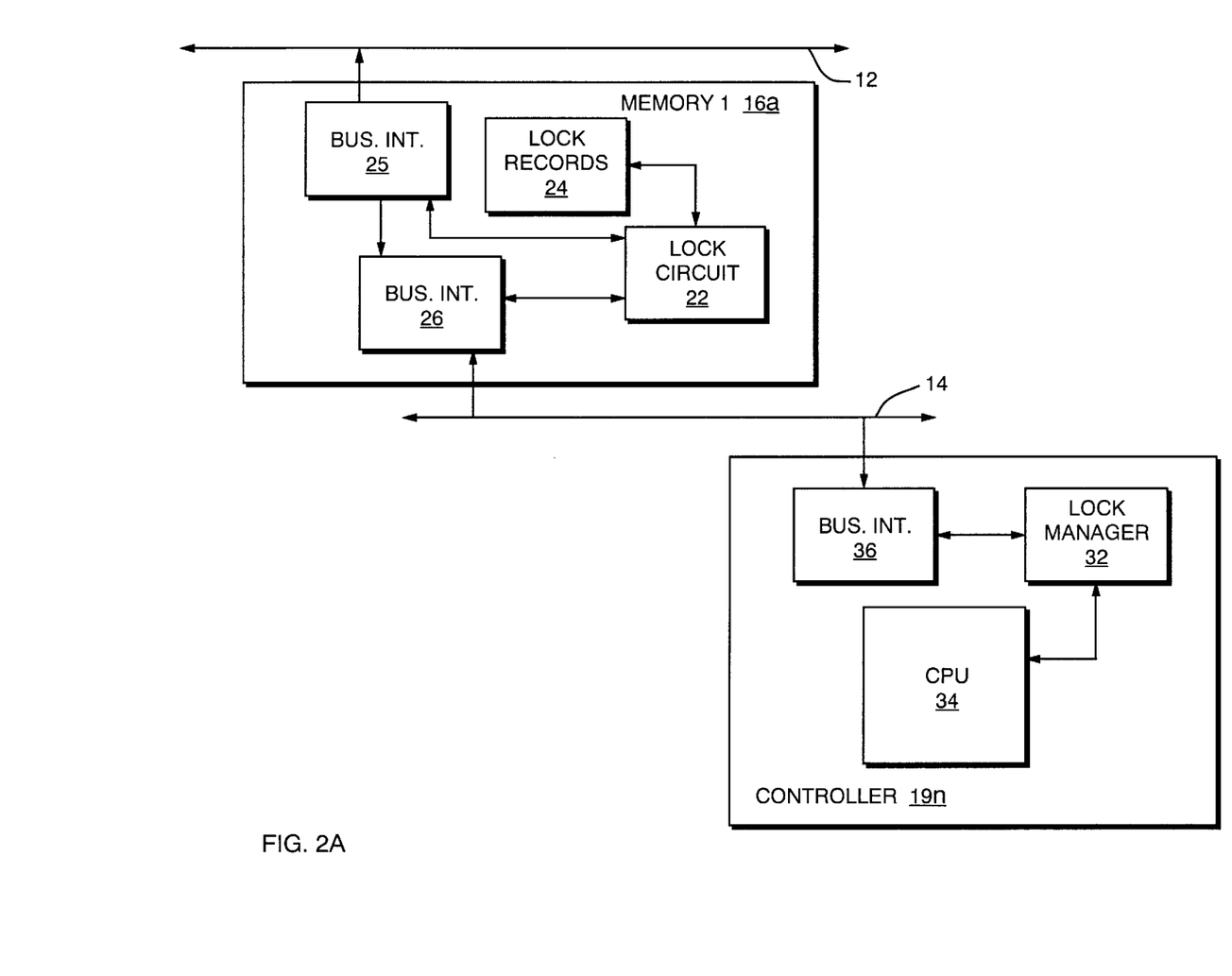
FIG. 2A is a block diagram of exemplary ones of the memory and controllers of the data processing system of FIG. 1 and shows in detail a preferred embodiment of the lock mechanism of the present invention

Referring now to FIG. 2A, the lock mechanism of the preferred embodiment of the present invention will be described in more detail. FIG. 2A depicts an exemplary one of the controllers from FIG. 1 as well as an exemplary one of the memories, also from FIG. 1. As shown in FIG. 2A, each one of the controllers includes among other things, a bus interface 36 coupled to CPU 34. Bus interface provides the interface between controller 19n and bus 14 as shown.

Memory 16a, includes, among other things a lock circuit 22 which is coupled to bus interfaces 25 and 26. Lock circuit 22 is also coupled to the lock record data structure 24. Bus interfaces 25 and 26 provide the interfaces between the shared memory 16a and buses 12 and 14 respectively. It should be understood that a single interface may be used as the interface between memory 16 and buses 12 and 14.

As described earlier on one embodiment of the invention, controller 19n will, with the CPU 34 decide to access and lock a particular resource by lock a lock record in lock record data structure 24. CPU 34 will prepare and transmit a read lock operation via bus interface 36 and bus 14 to memory 16a.

The read lock operation will be received by bus interface 26 and pass to lock circuit 22. The read lock operation will indicate to lock circuit 22 that controller 19n wished to read a particular lock record from the lock record data structure 24. Memory 16a will respond in two ways. First, memory 16a will have the lock circuit 22 access the lock record data structure 24, and will read the data from the particular lock record, and will transmit data from the lock record to controller 19n via bus interface 26. If lock record operation indicates a particular resource is locked, controller 19n will recognize this, and will keeping trying until it is able to secure the resource for itself. Memory 16a, at this time, will not update the lock record. Unlike some prior art locking mechanisms, no analysis of the lock record is not done apart from the locking process. The second item accomplished by the memory 16a is the setting of reservations. Upon receipt of the read lock operation, memory 16a will reserve (as shown in FIG. 3A) the address of the particular lock record and the identifier of the controller (or CPU) which made the request.

Next, the CPU 34 of controller 19n will prepare and send, through bus interface 26 and bus 14 to the memory 16a, a conditional write operation. The conditional write operation will be received by the bus interface 26 and passed to lock circuit 22. The conditional write operation, similar to the read lock operation, will contain two types of information. First, the identifier of the controller which sent the conditional write is included. Second, the address of the lock record in the locked record data structure which is desired to be locked is included. Upon receipt of the conditional write, the lock circuit 22, will prior to writing the data, look at the information contained in the conditional write operation (address, identifier) and check its if that particular identifier has reserved that particular address. If the two pieces of information are the same from the two different operations, the indication is that controller 19n will be completing the lock sequence. At that time lock circuit 22 will lock the lock record in the locked record data structure 24. Once conditional write operation has been completed, controller 19n will have exclusive control of the resource associated with the particular lock record until controller 19n releases the lock.

It should be understood, that through the use of the reservations, no other controller can lock the desired resource prior to the actual lock being completed. It is also noted, that throughout the entire transaction the bus and/or memory remain available to other controllers in the data processing system. The only item "locked" is the address of the lock record.

If, as indicated previously, the conditional write request is not received within a predetermined time period, the reservation of the specific address, including the identifier, is removed. Depending on subsequent operations and requests which are transmitted into the memory 16a, those operations will succeed or fail based upon the two pieces of data (address, identifier).

Figure 3:
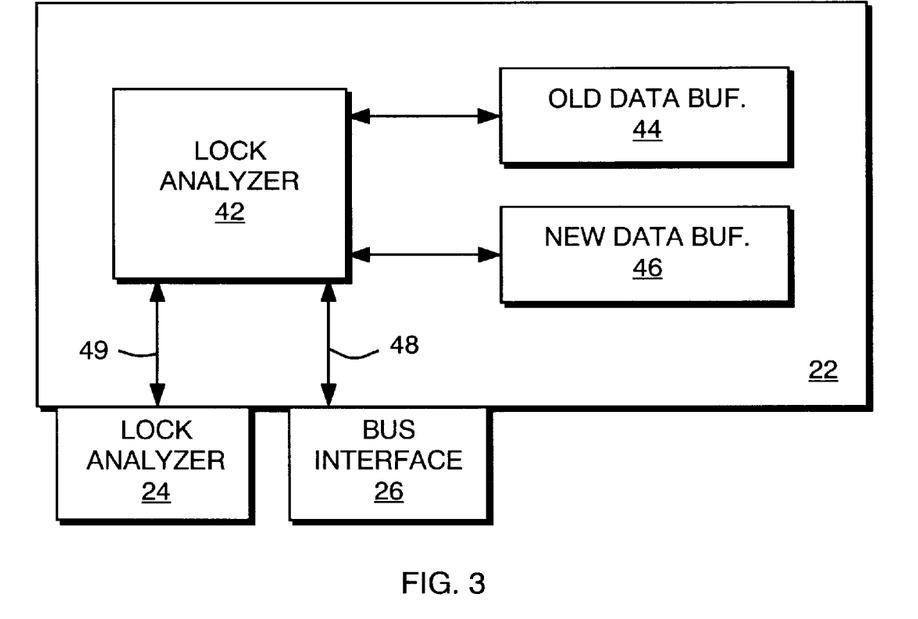
FIG. 3 is a block diagram of one of the lock mechanisms included in a memory of the data processing system of FIG. 1.
Figure 3A:
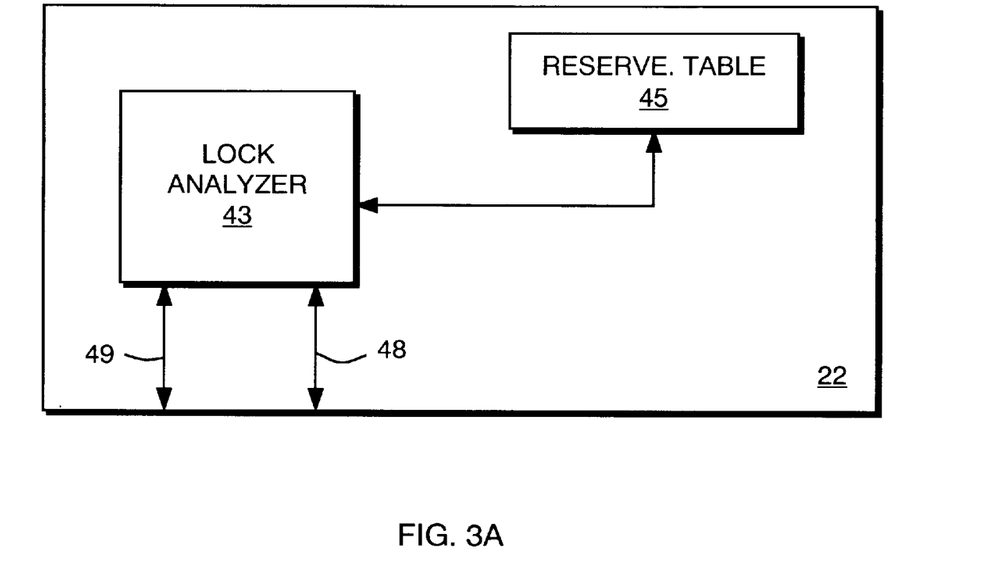
FIG. 3A is a block diagram of an exemplary one of the lock mechanisms included in a memory of the data processing system of FIG. 1
Figure 4:
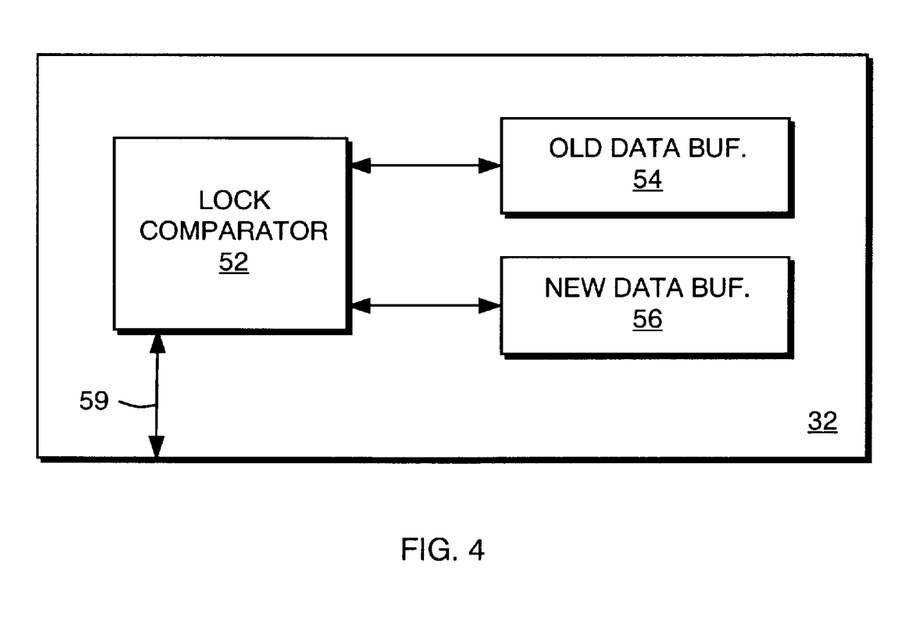
FIG. 4 is a block diagram of one of the lock mechanisms included in a controller of the data processing system of FIG. 1.

Referring now to FIGS. 3 and 4, one embodiment of the lock circuit 22 and lock manager 32 respectively will be described. Referring first to FIG. 3, lock circuit 22 is shown to include a lock analyzer 42 which is coupled to both an old data buffer 44 and a new data buffer 46. In addition, lock analyzer 42 is also coupled via bus 49 to the lock records 24 (FIG. 2) as well as being coupled via bus 48 to bus interface 26 (FIG. 2). As described previously during the lock manipulation process lock, lock circuit 22 will first read the appropriate lock record data from lock record data structure 24. This is accomplished by transmitting the data over bus 49 to lock analyzer 42. Lock analyzer 42 will then transmit the lock data over bus 48 to the bus interface 26 and over bus 14 to controller 19n. Ultimately, the lock record data is received by the lock manager 32 of controller 19n.

Referring now to FIG. 4, lock manager 32 is shown to include a lock comparator 52 as well as an old data buffer 54 and a new data buffer 56. When the lock comparator receives the lock record data as read from memory 16a via bus 59, the lock record data will be placed in old data buffer 54. The lock comparator 52 will at that time examine the data in old data buffer 54 to determine if resource associated with the lock record has already been locked. If the lock record does not indicate that the resource has already been locked then the new lock record data which has been placed into new data buffer 56 by CPU 34 (FIG. 3) will be transmitted by lock comparator 52 over bus 59 along with the old data from old data buffer 54 back to the lock circuit 22 of memory 16a. Once received by the lock circuit 22, the old lock record data will be placed into the old data buffer 44 and the newly created lock record data will be placed in the new data buffer 46. At this time, the lock analyzer 42 will again read the same lock record data via bus 49 and compare the newly read lock record data to the data stored in old data buffer 44. If the newly read lock record data matches the data stored in the old data buffer 44, that indicates that a lock has not been achieved in the interim and at this point in time the lock analyzer will transmit the data from new data buffer 46 into the lock record of lock records 24. This process thus grants controller 19n exclusive control over the resource associated with the particular lock record with locking either system bus 12 or 14 and without locking either memory 16a or 16b.

Figure 4A:
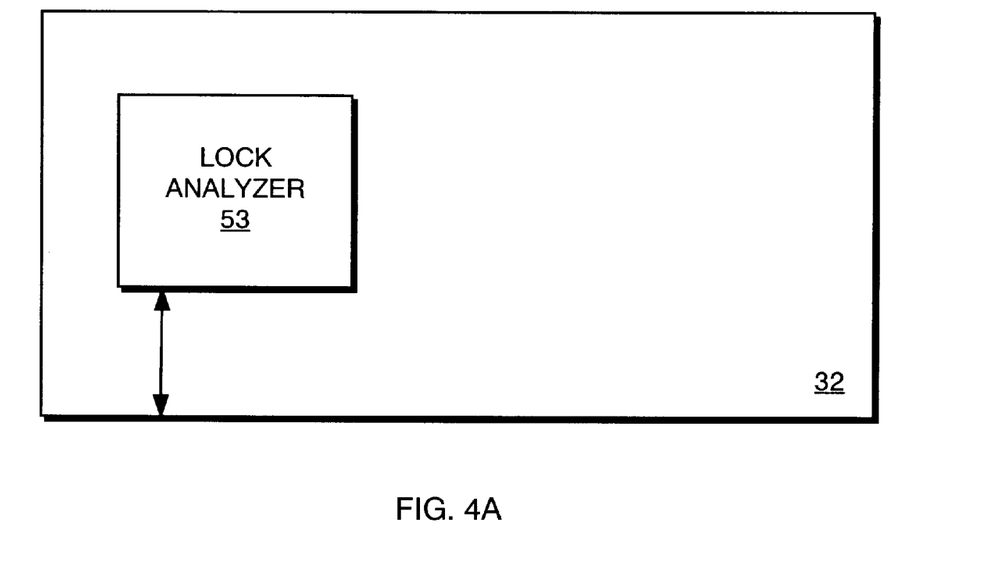
FIG. 4A is a block diagram of an exemplary one of the lock mechanisms included in a controller of the data processing system of FIG. 1.

Referring now to FIGS. 3A and 4A, in the preferred embodiment of the invention, lock circuit 22 and the lock manager 32 respectively will be described. Referring first to FIG. 5, lock circuit 22 is shown to include lock analyzer 43 which is coupled to a reservation table 45. In addition lock analyzer is also coupled via bus 49 to the lock records 24 (FIG. 2A) as well as being coupled via bus 48 to bus interface 26 (FIG. 2A). As previously described during the lock manipulation process, lock circuit 22 will first read the appropriate lock record from lock record data structure 24. This is done by transmitting the data over bus 49 to lock analyzer 43. Lock analyzer 43 will then transmit the lock data over bus 48 to bus interface 26 over bus 14 to controller 19n. Ultimately, the lock record data is received by the lock manager 32 of controller 19n. Unlike other embodiments of the present invention, the matching and/or comparison operations are not done in a controller 19n, but in memory.

After receiving the read lock operation from the controller 19n, the lock analyzer 43 places the address of the lock record and the identifier of the CPU that sent the lock record into the reservation table 58. It should be understood that the memory 16a contains a list of the controllers in the data processing system along with knowledge of the address in memory as pertain to locking operations. When the memory is required to reserve the information it places an entry into the reservation table which including the reserved address and the identification of the controller which reserved the address. Subsequently, the bus 14 (FIG. 2A) and memory 16a (FIG. 2A) are released. Next the memory receives the conditional write operation from the controller 19n.

At this time, lock analyzer 43 looks at certain data received in the conditional write operation (i.e. address of lock record, identifier of CPU that sent conditional write) in view of the information previously stored in the reservation table 58. If there is a match of both pieces of information respectively, lock analyzer 43 will transmit the data for the new lock to the lock record of lock records 24. This grants controller 19n exclusive control over the resource associated with the particular record.

Turning now to FIG. 4A, which shows the lock manager 32. A lock analyzer 53 is shown. Only a single lock analyzer is required to make an initial determination as to whether a resource is already locked. As previously described, the lock analyzer 53 examines the lock record to determine the status of the lock indicator (i.e. is it locked?).

Thus, the present invention discloses a process and apparatus for allowing lock manipulations do be done with a no additional of locking of system busses and memory. Additionally, the present invention allows the controller 19n to expend significantly less resources and processing cycles to acquire a resource lock, and allows the controller 19n to be freed up to accomplish other tasks.

Other variations of the lock mechanism described above are contemplated by the present inventions. Each of the variations takes advantage of the speed increase gained by moving critical portions of the lock functions into the memories to be performed by the memory hardware rather than the software of the requesting processors.

One variation of one embodiment of the invention is the setting of a software type lock in a single transaction. This may be possible where it is known before hand what the data representation of a free lock is. For example, it may be known that the lock record associated with a particular resource has a value of all 0's when the resource is not locked. In this case the processor seeking to lock the resource may, in a single transaction send a the new and old data packets without first reading lock data from the memory. Since the processor knows the unlocked resource record data, it simply transmits that as the old data along with the new lock data. When the memory receives the new and old data, it operates as described above. That is, it compares the old data received from the processor to the data in the lock record. If the data match, the resource is not locked and the memory will proceed to write the new lock data to the lock record. In this way, a processor locks a resource with a single bus transaction which did not lock either the bus or the memory.

Another variation is to use the basic lock concepts of the present invention to turn bits on and off in certain shared data locations in memory. To manipulate individual bits, the process for performing software locks described above my be used with the substitution of a logical "OR" or "AND" operation for the compare or analyze operation used to set a software lock.

In addition, the lock record data structure of the preferred embodiment is described as being stored in a shared memory of the data processing system. It should be understood that the lock mechanism of the present invention anticipates accessing any shared resource regardless of type. Thus for example, two processor which may lock a bus for exclusive communications may use the lock mechanism of the present invention to perform their communications without the need for locking the bus over which they communicate.

As mentioned previously, the present invention is broadly applicable to multi-processor data processing systems which employ a shared memory. Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A method of providing lock services for shared resources comprising the steps of:

transmitting, by a first processor, a read lock request over a bus to a shared memory;

reading data from said read locked request, said data identifying an address of a lock record and an identifier of said first processor;

transmitting, by said first processor, a conditional write request over said bus to said shared memory, data of said conditional write request including an address of a lock record and an identifier of a processor;

analyzing data from said conditional write request versus said data from said read lock request; and if said data from said conditional write request matches data from said read lock request, updating said lock record.

2. The method of claim 1, said method further comprising the step of:

determining, prior to updating said lock record that an address in said shared memory is not locked by a second processor.

3. The method of claim 2, said method further comprising the steps of:

locking said bus and said shared memory, during the transmission of said read lock request; and releasing said lock of said bus and memory at the completing of said read lock request.

4. The method of claim 1, said method further comprising the step of:

if said data from said conditional write does not match said data from said read lock request, sending a failure notification to said first processor.

5. The method of claim 3, wherein said lock record is located in said memory, said memory being coupled to said processors, said method further comprising the step of:

reserving said data from said read lock request into a local storage area in said memory.

6. The method of claim 5, said method further comprising the step of:

if said conditional write request is not transmitted in a predetermined period of time, ending said conditional write request.

7. A data processing system having access to shared resources, said data processing system comprising:

a plurality of processing units coupled to at least one memory by a shared bus; and an analyzer within said memory for determining whether data received in a first transmission from a first one of said plurality of processors matches data received in a second transmission from one of said plurality of processors, wherein a match is achieved if said data received in said second transmission is from said first one of said plurality of processors and is requesting the a lock of a first shared resource, wherein said first transmission has requested a lock of said first shared resource.

8. The data processing system of claim 7, said data processing system further comprising:

a reservation table coupled to said analyzer, in which said analyzer reserves said data from said first transmission, prior to analyzing said data from said first transmission with said data from said second transmission.

* * * * *